United States Patent
Nakanishi et al.

(10) Patent No.: US 12,083,499 B2
(45) Date of Patent: Sep. 10, 2024

(54) GUARD COLUMN AND METHOD FOR PRODUCING GUARD COLUMN

(71) Applicant: SHOWA DENKO K.K., Tokyo (JP)

(72) Inventors: Hirotsugu Nakanishi, Yokohama (JP); Ritsuko Wakayama, Kawasaki (JP)

(73) Assignee: Resonac Corporation, Tokyo (JP)

( * ) Notice: Subject to any disclaimer, the term of this patent is extended or adjusted under 35 U.S.C. 154(b) by 532 days.

(21) Appl. No.: 17/311,437

(22) PCT Filed: Nov. 11, 2019

(86) PCT No.: PCT/JP2019/044053
§ 371 (c)(1),
(2) Date: Jun. 7, 2021

(87) PCT Pub. No.: WO2020/121706
PCT Pub. Date: Jun. 18, 2020

(65) Prior Publication Data
US 2022/0023832 A1 Jan. 27, 2022

(30) Foreign Application Priority Data
Dec. 10, 2018 (JP) .................. 2018-230896

(51) Int. Cl.

| | |
|---|---|
| *B01J 20/283* | (2006.01) |
| *B01J 20/10* | (2006.01) |
| *B01J 20/28* | (2006.01) |
| *B01J 20/30* | (2006.01) |
| *B01J 20/32* | (2006.01) |

(Continued)

(52) U.S. Cl.
CPC ........... *B01J 20/283* (2013.01); *B01J 20/103* (2013.01); *B01J 20/28004* (2013.01); *B01J 20/28061* (2013.01); *B01J 20/3092* (2013.01); *B01J 20/3204* (2013.01); *B01J 20/3219* (2013.01); *B01J 20/3248* (2013.01);
(Continued)

(58) Field of Classification Search
CPC .... B01J 20/103; B01J 20/283; B01J 20/3092; B01J 20/28004; B01J 20/28061; B01J 20/28083; B01J 20/3204; B10J 20/3219; B10J 20/3248; B10J 20/288; G01N 30/56; G01N 30/74; G01N 30/08
See application file for complete search history.

(56) References Cited

U.S. PATENT DOCUMENTS

| | | | | |
|---|---|---|---|---|
| 2013/0135610 A1* | 5/2013 | Bouvier | ............ | B01J 20/28004 356/72 |
| 2014/0020454 A1* | 1/2014 | Yotani | .................... | G01N 30/88 73/61.53 |
| 2015/0276690 A1* | 10/2015 | Hudalla | ............. | B01J 20/28078 73/23.39 |

FOREIGN PATENT DOCUMENTS

| | | |
|---|---|---|
| JP | 6219569 B2 | 10/2017 |
| JP | 2018-062440 A | 4/2018 |
| JP | 2018-189441 A | 11/2018 |

OTHER PUBLICATIONS

English Translation of JP2018-062440.*
InterSustain Amide Analytical Columns. GL Sciences Inc., Nov. 7, 2016 (URL:www.gls.co.jp/product/lc_columns/lc-columns/01804.hml).

(Continued)

*Primary Examiner* — Helen C Kwok
(74) *Attorney, Agent, or Firm* — Sughrue Mion, PLLC

(57) ABSTRACT

Provided is a guard column including a filling part having a length of 2.0 cm to 3.5 cm formed of a filler, in which the filler is made of porous silica gel having a hydrophilized surface and an average particle size of 1.5 μm to 2.5 μm, and a pressure difference when an aqueous solution is fed at a linear flow rate of 2.1 cm/min is 4.0 MPa or more.

14 Claims, 4 Drawing Sheets

(51) Int. Cl.
    *G01N 30/08*     (2006.01)
    *G01N 30/56*     (2006.01)
    *G01N 30/74*     (2006.01)
(52) U.S. Cl.
    CPC ............. *G01N 30/08* (2013.01); *G01N 30/56* (2013.01); *G01N 30/74* (2013.01); *G01N 2030/565* (2013.01)

(56) References Cited

OTHER PUBLICATIONS

InterSustain Amide Guard Column for UHPLC. GL Sciences Inc., Jul. 19, 2017 (URL:www.gls.co.jp/product/lc_columns/lc-columns/02653.html).

Tohru Ikegami, et al., "A Perspective of Hydrophilic Interaction Chromatography-Development and the Characteristics of the separation mode", Chromatography, 2008, pp. 1-6, vol. 29, No. 2.

Intrada SEC, Imtakt Technical Report, Imtakt Corp., Jun. 5, 2017, pp. 1-4, (URL:www.imtakt.com/Brochure/Tro7AJ.pdf).

Joomi Ahn, et al., "Separation of 2-aminobenzamide labeled glycans using hydrophilic interaction chromatography columns packed with 1.7 µm sorbent", Journal of Chromatography B, 2010, pp. 403-408.

International Search Report for PCT/JP2019/044053 dated Feb. 10, 2020 [PCT/ISA/210].

Extended European Search Report dated Aug. 2, 2022, issued in European Application No. 19895920.7.

Ismail Omar H et al: "Ultra-fast high-efficiency enantioseparations by means of a teicoplanin-based chiral stationary phase made on sub-2µm totally porous silica particles of narrow size distribution", Journal of Chromatography A, Elsevier, Amsterdam, NL, vol. 1427, 2016, pp. 55-68 (14 pages).

Szabolcs Fekete et al: "Critical evaluation of fast size exclusion chromatographic separations of protein aggregates, applying sub-2µm particles", Journal of Pharmaceutical and Biomedical Analysis, vol. 78-79, 2013, pp. 141-149 (9 pages).

* cited by examiner

GUARD COLUMN AND METHOD FOR PRODUCING GUARD COLUMN

TECHNICAL FIELD

The present invention relates to a guard column, a liquid chromatograph, a method for analyzing a polymer compound, and a method for producing a guard column.

This application is a National Stage of International Application No. PCT/JP2019/044053 filed Nov. 11, 2019, claiming priority based on Japanese Patent Application No. 2018-230896 filed in Japan on Dec. 10, 2018, the content of which is incorporated herein by reference.

BACKGROUND ART

Conventionally, light scattering detectors have been widely used as detectors for high-performance liquid chromatography (HPLC). A light scattering detector is a detector based on a principle of a static light scattering method. The light scattering detector irradiates a sample solution with laser light of a constant wavelength and measures a scattered light intensity generated from the sample by Rayleigh scattering. An HPLC using the light scattering detector can measure an absolute molecular weight and a molecular size of an eluted sample by utilizing information on the scattered light intensity.

In HPLC using a light scattering detector, since an absolute molecular weight of a sample can be measured, a size-exclusion chromatography column is frequently used.

In this case, a sample is separated according to a size of a molecule by the size-exclusion chromatography column, and an absolute molecular weight and a molecular size are measured by the light scattering detector.

In size-exclusion chromatography, an organic solvent may be used or an aqueous solution may be used according to properties of a sample to be analyzed. In size-exclusion chromatography using an aqueous solution, a water-soluble sample is a subject to be analyzed. As a water-soluble sample, water-soluble polymers, proteins, or the like can be exemplified.

A filler having pores according to a size of a sample is filled into the size-exclusion chromatography column. In size-exclusion chromatography using proteins as a sample, a silica gel-based filler utilizing characteristics of a pore distribution is suitably used. As the silica gel-based filler, silica gel having a hydrophilized surface is widely used to suppress adsorption of proteins on the filler.

In size-exclusion chromatography of proteins using a liquid chromatograph in which a column utilizing a silica gel-based filler and a light scattering detector are combined, information on a molecular form of a protein can be obtained at the same time as an absolute molecular weight of the protein. Therefore, the above-described size-exclusion chromatography is expected to be applied to elucidation of the function of proteins.

Patent Document 1 describes a method for reducing ghost peaks obtained by a light scattering detector during exclusion chromatography. Specifically, size-exclusion chromatography in which a sample is loaded onto a stationary phase material including an organic-inorganic hybrid core material at a column inlet pressure larger than 1000 psi is described.

In size-exclusion chromatography in which a column using a silica gel-based filler and a light scattering detector are used, it has been required to curb injection noise. Injection noise refers to a wide "ghost peak" that is generated by pressure variation (injection shock) associated with sample injection into a column and is observed near an exclusion limit on a chromatogram. The injection noise is a problem specific to a case in which a column using a silica gel-based filler is utilized. When injection noise is generated, a peak of a separated sample and the injection noise overlap on a chromatogram, and analysis of the sample may be difficult.

CITATION LIST

Patent Document

Patent Document 1: Japanese Patent No. 6219569

SUMMARY OF INVENTION

Technical Problem

The present invention has been made in view of the above circumstances, and an objective of the present invention is to provide a guard column used for size-exclusion chromatography in which a column using a filler containing porous silica gel and a light scattering detector are used and capable of curbing injection noise, and a method for producing the guard column.

Another objective of the present invention is to provide a liquid chromatograph in which the above-described guard column is provided and injection noise does not easily occur.

Still another objective of the present invention is to provide a method for analyzing a polymer compound in which the above-described liquid chromatograph is used and injection noise does not easily occur.

Solution to Problem

In order to solve the above-described problems, the present inventors have focused on a guard column disposed on an upstream side of a column using a filler containing porous silica gel and conducted intensive research thereon.

As a result, it has been found that a guard column including a filling part having a length of 2.0 cm to 3.5 cm formed of a filler, in which the filler is made of porous silica gel having a hydrophilized surface and an average particle size of 1.5 μm to 2.5 μm, and a pressure difference when an aqueous solution is fed at a linear flow rate of 2.1 cm/min is 4.0 MPa or more may be used.

Further, it has been ascertained that, when a liquid chromatograph in which the above-described guard column, a size-exclusion chromatography column filled with a filler containing porous silica gel, and a light scattering detector are provided in this order from an upstream side is used, injection noise in size-exclusion chromatography can be curbed, and thus the present invention has been realized.

That is, a first aspect of the present invention is a guard column described in the following [1].

[1] A guard column comprising a filling part having a length of 2.0 cm to 3.5 cm formed of a filler, in which the filler includes porous silica gel having a hydrophilized surface and an average particle size of 1.5 μm to 2.5 μm, and a pressure difference when an aqueous solution is fed at a linear flow rate of 2.1 cm/min is 4.0 MPa or more.

As described below, the guard column of the first aspect preferably has the features described in the following [2], [3], and [7] to [11]. It is also preferable to combine two or more of these features.

[2] The guard column according to [1], in which the porous silica gel has an average pore size of 25 nm to 35 nm and a specific surface area of 100 m$^2$/g to 300 m$^2$/g.

[3] The guard column according to [1] or [2], the column is used for size-exclusion chromatography in which a column using the filler containing porous silica gel and a light scattering detector are used.

A second aspect of the present invention is a liquid chromatograph described below.

[4] A liquid chromatograph including the guard column according to any one of [1] to [3], a size-exclusion chromatography column filled with a filler containing porous silica gel, and a light scattering detector in this order from an upstream side.

A third aspect of the present invention is a method for analyzing a polymer compound described below.

[5] A method of analyzing a polymer compound, which comprises analyzing a polymer compound with size-exclusion chromatography using the liquid chromatograph according to [4].

A fourth aspect of the present invention is a method for producing a guard column described below.

[6] A method for producing a guard column according to any one of [1] to [3], including a step of filling a filler including porous silica gel having a hydrophilized surface and an average particle size of 1.5 µm to 2.5 µm at a filling pressure of 12 MPa to 40 MPa per 1 cm in length to form a filling part having a length of 2.0 cm to 3.5 cm.

[7] The guard column according to [1], in which a diameter of the filling part is 0.4 cm to 0.9 cm.

[8] The guard column according to [1], in which the porous silica gel having a hydrophilized surface is silica gel which is obtained by treating porous silica gel whose surface is not hydrophilized with a silane coupling agent to form a functional group derived from the silane coupling agent and further reacting the functional group with a hydrophilic compound.

[9] The guard column according to [8], in which the silane coupling agent is a silane coupling agent having an epoxy group, and the hydrophilic compound is water, a polyhydric alcohol compound, or a compound having an epoxy group.

[10] The guard column according to [1], in which the porous silica gel having a hydrophilized surface is silica gel which is obtained by surface-treating porous silica gel whose surface is not hydrophilized with glycidoxypropyltrimethoxysilane and ring-opening an epoxy group formed on a surface thereof with water.

[11] The method of analyzing a polymer compound according to [5], in which the polymer compound is a protein.

Advantageous Effects of Invention

In a liquid chromatograph in which the guard column of the present invention, a size-exclusion chromatography column filled with a filler containing porous silica gel, and a light scattering detector are provided in this order from an upstream side, injection noise in size-exclusion chromatography does not easily occur.

DESCRIPTION OF EMBODIMENTS

Figure 1:
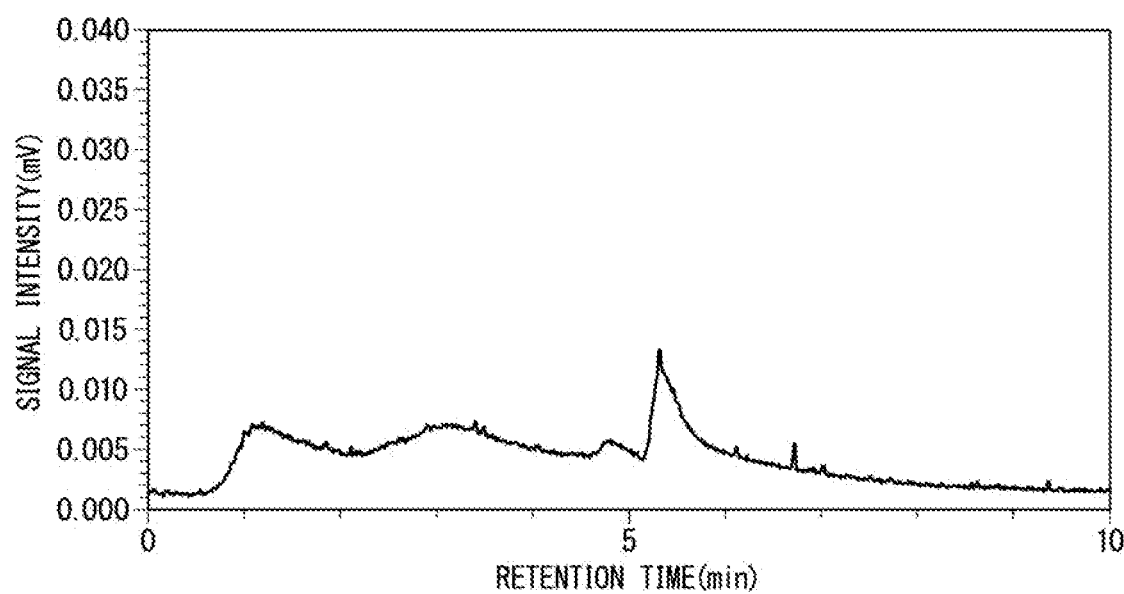
FIG. 1 is a chromatogram showing a result of analyzing a polymer compound using a liquid chromatograph of Example 1.

Hereinafter, a guard column and a method for producing the guard column, a liquid chromatograph, and a method of analyzing a polymer compound of the present invention will be described in detail. The present invention is not limited only to the embodiments described below. Changes, additions, and omissions may be made within a range not departing from the gist of the present invention. For example, additions, omissions, changes, substitutions, or the like can be made to types, numbers, amounts, materials, configurations, or the like within a range not departing from the gist of the present invention.

(Research by the Present Inventors)

In order to curb injection noise in size-exclusion chromatography in which a size-exclusion chromatography column filled with a filler containing porous silica gel, and a light scattering detector are used, the present inventors conducted intensive research as described below.

First, research was performed on the basis of the technology described in Patent Document 1. Patent Document 1 describes a method for reducing an incidence of noise detected by a light scattering detector in size-exclusion chromatography by loading a sample onto a stationary phase material including an organic-inorganic hybrid core material at a column inlet pressure larger than 1000 psi.

The present inventors performed research using an LW-403 4D (manufactured by Showa Denko KK, column size: an inner diameter of 0.46 cm, a length of 15.0 cm) which is a column filled with a filler containing porous silica gel instead of using a stationary phase material containing an organic-inorganic hybrid core material. The reason for using the column described above was to ascertain whether or not the same effect could be obtained also with a filler containing porous silica gel.

In an evaluation, specifically, the above-described column was connected to a high-performance liquid chromatography (HPLC) apparatus and was fed with a 50 mM phosphate buffer solution as an eluent at a feed rate of 0.35 ml/min (corresponding to a linear flow rate of 2.1 cm/min). As a light scattering detector, a DAWN8$^+$ (manufactured by Wyatt technology) was used. A sample was injected into the apparatus under such conditions. In a chromatogram obtained at this time, the present inventors ascertained that large amount of injection noise was generated near an exclusion limit. As described in Comparative Example 1 to be described later, a pressure at a column inlet at this time was 14 MPa (≈2030 psi).

Such a result indicates that when a column filled with a filler containing porous silica gel is used, an effect of curbing injection noise cannot be sufficiently obtained even if the technology of Patent Document 1 in which the sample is loaded with a column inlet pressure larger than 1000 psi is applied.

Therefore, the present inventors have conducted further intensive research on whether or not injection noise can be curbed when a guard column is installed upstream of the column filled with the filler containing porous silica gel. More specifically, the present inventors conducted various types of research focusing on shapes of a filling part, types and average particle sizes of a filler, and filling states of the filler of the guard column.

Further, the "guard column" is a column that is used by being attached between an injector and an analytical column to protect the analytical column.

As a result of the research, it has been found that, when a particular filler is filled at a particular filling pressure and when a guard column having a filling part formed in a particular length is used, injection noise can be curbed to such an extent that a problem is not caused in analyzing a polymer compound.

Also, the present inventors have found that a pressure difference when an aqueous solution is fed into the guard column at a linear flow rate of 2.1 cm/min can be suitably used as an index of the filling state of the filler in the filling part of the guard column. This is because it is presumed that a guard column in which the above-described pressure difference is sufficiently large has a satisfactory filling state in which the filler is aligned substantially uniformly in the filling part without gaps and injection noise can be effectively reduced.

In the present specification, the "pressure difference when an aqueous solution is fed at a linear flow rate of 2.1 cm/min" of the guard column means a difference between a pressure A and a pressure B to be described below. Specifically, first, a pump, a guard column, and an analytical column are connected in this order from an upstream side using, for example, pipes. Then, a pressure (pressure A) when the aqueous solution is fed into the guard column at the linear flow rate of 2.1 cm/min is measured. An empty column in which the filler is removed from the guard column is connected in place of the guard column, and a pressure (pressure B) when the aqueous solution is fed into the empty column at the linear flow rate of 2.1 cm/min is measured in the same manner. Then, a difference between these pressures is referred to as the pressure difference.

As the aqueous solution that can be used for measuring the above-described pressure difference, a known aqueous solution, specifically, a known aqueous solution that is used when a water-soluble sample such as a protein is analyzed by size-exclusion chromatography can be used. As a specific example of the aqueous solution, a phosphate buffer solution to which one or more types of salts selected from sodium chloride, potassium chloride, sodium sulfate, and the like are added, or the like can be exemplified. When these aqueous solutions are used, no difference due to a difference in types of aqueous solutions is observed when the above-described pressure difference is obtained. As a more specific example, for example, a 50 mM phosphate buffer solution (containing 0.3M NaCl having a pH of 6.7) or the like can be suitably used as the aqueous solution.

Also, as the linear flow rate when the above-described pressure difference was measured, 2.1 cm/min, which is a typical eluent flow rate when water-soluble samples such as proteins are analyzed by size-exclusion chromatography, was used. The linear flow rate of 2.1 cm/min corresponds to a volumetric flow rate of 0.35 ml/min when an inner diameter of the guard column is 0.46 cm and corresponds to a volumetric flow rate of 1.0 ml/min when the inner diameter of the guard column is 0.8 cm.

In this way, as a result of various types of research, the present inventors have found that an effect of curbing injection noise can be sufficiently obtained when a specific guard column is used, that is, when a guard column including a filling part having a length of 2.0 cm to 3.5 cm formed of a filler, in which the filler is made of porous silica gel having a hydrophilized surface and an average particle size of 1.5 μm to 2.5 μm, and the above-described pressure difference is 4.0 MPa or more is used.

Also, as a result of various types of research, it has been found that the above-described guard column having an excellent effect can be formed by a specific method.

That is, it has been found that an excellent guard column having the above-described pressure difference of 4.0 MPa or more can be obtained by a method of forming a filling part having a length of 2.0 cm to 3.5 cm by filling with a filler made of porous silica gel having a hydrophilized surface and an average particle size of 1.5 μm to 2.5 μm at a filling pressure of 12 MPa to 40 MPa per 1 cm in length. In this way, the present invention has been completed.

"Guard column" The guard column of the present embodiment is a guard column that can be suitably used for size-exclusion chromatography in which a column using a filler containing porous silica gel and a light scattering detector are used.

The guard column of the present embodiment can be preferably disposed on an upstream side of the column. Specifically, it can be suitably used as a guard column in a liquid chromatograph in which a guard column, a size-exclusion chromatography column filled with a filler containing porous silica gel (hereinafter referred to as an "analytical column" in some cases), and a light scattering detector are provided in this order from an upstream side.

The guard column of the present embodiment indispensably includes a filling part. The guard column of the present embodiment preferably includes an inlet part component, an outlet part component, a cylindrical component extending from an inlet side to an outlet side, and the filling part formed of a filler filled into the cylindrical component.

In the guard column of the present embodiment, the inlet part component is fixed to the inlet side of the cylindrical component, and the outlet part component is fixed to the outlet side of the cylindrical component. The filling part is formed in the cylindrical component. The inlet part component and the outlet part component each include a mechanism for being fixed to the cylindrical component, a connection part for connecting the cylindrical component to a pipe, and a filter for preventing the filler from flowing out of the cylindrical component. The cylindrical component may be integrally molded with the outlet part component. The cylindrical component may be completely covered by the inlet part component and the outlet part component.

The cylindrical component has an inner wall surface having a constant cross-sectional area and extending in a length direction. A length of the inner wall surface of the cylindrical component can be arbitrarily selected but is generally 0.5 cm to 4.5 cm, preferably 2.0 cm to 3.5 cm, and more preferably 2.0 cm to 3.0 cm. Although an inner diameter of the cylindrical component can be arbitrarily selected, it is generally 0.1 cm to 20 cm and preferably 0.1 cm to 6 cm, and as will be described later, it is more preferably 0.1 cm to 2 cm and still more preferably 0.2 to 1.0 cm.

A length and a diameter of the guard column of the present embodiment can be arbitrarily selected. The guard column of the present embodiment is preferably cylindrical or substantially cylindrical but is not limited only to these. The mechanism for fixing the inlet part component and the outlet part component to the cylindrical component can be arbitrarily selected. For example, the inlet part component and the outlet part component, or the inlet part component and the outlet part component may be directly connected to the cylindrical part by a type of screw thread using a male screw structure and a female screw structure. However, there is no limitation only to these examples. Materials of the inlet part component, the outlet part component, and the cylindrical component can be arbitrarily selected as required as will be described later.

(Filling Part)

The filling part is formed of a filler. The filling part is formed in the cylindrical component that is partitioned from the outside by the inlet part component and the outlet part component. An outer shape of the filling part in the present embodiment has a columnar shape that follows a shape of an inner wall of the cylindrical component. More specifically, the filling part preferably has a columnar shape having the same length as the length of the inner wall surface of the cylindrical component and having the same diameter dimension as the inner diameter of the cylindrical component.

The length of the filling part is 2.0 cm to 3.5 cm and preferably 2.0 cm to 3.0 cm. The length of the filling part may be 2.0 cm to 2.8 cm or 2.0 to 2.5 cm as necessary. When the length of the filling part is 2.0 cm or more, injection noise can be sufficiently curbed in size-exclusion chromatography using the analytical column and the light scattering detector. When the length of the filling part is 3.5 cm or less, an influence on an analysis time and an analysis result caused by disposing the guard column upstream of the analytical column can be suppressed.

The guard column of the present embodiment may be one in which a plurality of guard columns of the present embodiment are connected in series in a guard unit. When the guard column of the present embodiment is one in which a plurality of guard units are connected in series, a "length of the filling part of the guard column" may indicate a total length obtained by adding all the lengths of the filling parts included in the plurality of guard units.

An inner diameter of the cylindrical component (which may also be referred to as an inner diameter of the guard column) can be, for example, 0.1 cm to 2 cm and can be appropriately selected according to types and amounts of samples to be analyzed. For example, when a protein is analyzed using the liquid chromatograph in which the guard column of the present embodiment, the analytical column, and the light scattering detector are provided in this order from an upstream side, the cylindrical component having an inner diameter of 0.4 cm to 0.9 cm is preferable used. The inner diameter of the cylindrical component may be considered as a diameter of the filling part.

Materials used for each component of the inlet part component, the outlet part component, and the cylindrical component forming the guard column can be each appropriately selected according to an eluent used for size-exclusion chromatography and a sample to be measured. Specifically, as the material of the above-described components, for example, stainless steel may be used, or a synthetic resin such as polyether ether ketone resin (PEEK) may be used. Also, the above-described components may be formed of materials different from each other, or a part or all thereof may be formed of the same material.

(Filler)

In the guard column of the present embodiment, the cylindrical component is filled with a filler. As the filler, porous silica gel having a hydrophilized surface is used. The porous silica gel having a hydrophilized surface may be a crushed shape or a spherical shape. A spherical shape is preferable.

The porous silica gel having a hydrophilized surface that is used as the filler has an average particle size of 1.5 µm to 2.5 µm and preferably 1.7 µm to 2.2 When the average particle size is 1.5 µm or more, excessive increase in pressure does not occur when an aqueous solution is fed into the guard column at a linear flow rate of 2.1 cm/min. Also, when the average particle size is 2.5 µm or less, a guard column having a pressure difference of 4.0 MPa or more when an aqueous solution is fed at the linear flow rate of 2.1 cm/min can be easily obtained.

The porous silica gel having a hydrophilized surface and an average particle size of 1.5 µm to 2.5 µm can be obtained by an arbitrarily selected method. For example, it can be obtained by preparing fillers made of hydrophilized porous silica gel having various particle sizes and subjecting these to a method of sieve classification using a mesh, particle size control using a wind power classifier, a centrifugal classification treatment, or the like.

The average particle size of the porous silica gel having a hydrophilized surface can be measured using a Coulter counter or an image analysis type particle size distribution measuring device. It is preferably measured with a Coulter counter. In the present embodiment, the average particle size of the porous silica gel having a hydrophilized surface used as the filler is a volume average size.

An average pore size of the porous silica gel having a hydrophilized surface can be appropriately selected according to a size of a molecule of a sample to be measured by chromatography. When a protein is analyzed using the liquid chromatograph in which the guard column of the present embodiment is provided on an upstream side of the analytical column, an average pore size of the porous silica gel having a hydrophilized surface contained in the guard column is preferably 25 nm to 35 nm and more preferably 28 nm to 32 nm. When the average pore size is 25 nm to 35 nm, proteins are easily separated in size-exclusion chromatography of proteins, and this is preferable.

Although a specific surface area of the porous silica gel having a hydrophilized surface can be arbitrarily selected, the specific surface area is preferably 100 $m^2/g$ to 300 $m^2/g$ and more preferably 100 $m^2/g$ to 200 $m^2/g$. When the specific surface area of the porous silica gel having a hydrophilized surface is 100 $m^2/g$ or more, since a function of preventing the analytical column from being contaminated by the guard column is more prominent, a length of the filling part can be made smaller. Also, a porous silica gel having a hydrophilized surface and a specific surface area of 300 $m^2/g$ or less does not have an excessively large pore volume. Therefore, a porous silica gel having a hydrophilized surface and a specific surface area of 300 $m^2/g$ or less serves as a filler having sufficiently high strength, and a pressure applied to the guard column can be prevented from becoming too high when an aqueous solution is fed into the guard column at a linear flow rate of 2.1 cm/min.

The average pore size and the specific surface area of the porous silica gel having a hydrophilized surface can be measured using a gas adsorption type specific surface area measuring device or a mercury porosimeter. Preferably, they are measured with a gas adsorption type specific surface area measuring device.

In the present embodiment, the porous silica gel having a hydrophilized surface is used as the filler of the guard column. Therefore, when a protein is analyzed using the liquid chromatograph in which the guard column of the present embodiment is provided upstream of the analytical column, proteins are not easily adsorbed on a surface of the filler of the guard column. Therefore, an influence on separation performance of a sample in the analytical column caused by including the guard column is small.

In the present embodiment, the "porous silica gel having a hydrophilized surface" means that a silanol group that is present on a surface of the porous silica gel has been modified by a hydrophilic organic compound. In other words, it means that the porous silica gel is in a state in which adsorption of proteins is suppressed by the modification. The porous silica gel having a hydrophilized surface preferably contains a structure derived from a reaction with a silane coupling agent, and more specifically, an organic siloxane structure derived from the above-described reaction.

The porous silica gel having a hydrophilized surface can be obtained by hydrophilizing a surface of a porous silica gel base material in which a surface thereof has not been hydrophilized by, for example, the method described below.

As the porous silica gel base material, it is preferable to use one having a desired average particle size. Thereby, porous silica gel with a hydrophilized surface having a desired average particle size can be easily obtained. An average particle size of the porous silica gel base material can be measured by the same method as that in the average particle size of the porous silica gel having a hydrophilized surface. Also, they can have the same average particle size.

The porous silica gel base material having a desired average particle size can be obtained by a method of, for example, preparing porous silica gel base materials having various particle sizes and subjecting these to sieve classification using a mesh, particle size control using a wind power classifier, a centrifugal classification treatment, or the like.

As a method of hydrophilizing a surface of the porous silica gel base material, although it can be arbitrarily selected, a method of performing a two-step process can be preferably exemplified. Specifically, a method of performing a first reaction process of reacting a porous silica gel base material with a silane coupling agent to obtain a base material having a functional group derived from the silane coupling agent, and then a second reaction process of reacting the base material having the functional group derived from the silane coupling agent with a hydrophilic compound to obtain porous silica gel having a hydrophilized surface can be used. When this method is performed, a silanol group of the porous silica gel can be preferably modified by a hydrophilic organic compound obtained by reacting the functional group derived from the silane coupling agent with the hydrophilic compound. Further, when a surface of the base material can be hydrophilized by the first reaction process only, the second reaction process may be omitted.

The reaction between the porous silica gel base material and the silane coupling agent in the first reaction process can be implemented by a method of heating and stirring the porous silica gel base material and the silane coupling agent under arbitrarily selected conditions, for example, in an organic solvent and/or an aqueous solution using a base or an acid as a catalyst.

As examples of the silane coupling agent, a silane coupling agent having an epoxy group, a silane coupling agent having an unsaturated group, a silane coupling agent having an amino group, a silane coupling agent which introduces an isocyanate group, and the like can be used.

As examples of the silane coupling agent having an epoxy group, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and the like can be exemplified. Of these, particularly, the 3-glycidoxypropyltrimethoxysilane is preferably used.

When the silane coupling agent having an epoxy group is used, water, a polyhydric alcohol compound, and/or a compound having an epoxy group are preferably used as the hydrophilic compound utilized in the second reaction process.

As the polyhydric alcohol compound, for example, any one or more types selected from mono, di, tri, tetra, or polyethylene glycol, monopropylene glycol, 1,3-propanediol, dipropylene glycol, 2,3,4-trimethyl-1,3-pentanediol, polypropylene glycol, glycerin, polyglycerin, 2-butane-1,4-diol, 1,4-butanediol, 1,3-butanediol, 1,5-pentanediol, 1,6-hexanediol, 1,2-cyclohexanedimethanol, and the like can be used.

In the second reaction process, as a method of reacting the base material having an epoxy group derived from the silane coupling agent obtained in the first reaction process with the polyhydric alcohol compound, for example, a known method such as a method using an acid or a base can be used.

As the compound having an epoxy group, for example, any one or more types selected from epoxy compounds such as ethylene glycol diglycidyl ether and glycidol, and haloepoxy compounds such as epichlorohydrin, epibromohydrin, and α-methyl epichlorohydrin can be used. Of these, particularly, glycidol is preferably used.

In the second reaction process, the epoxy group introduced by reacting the base material having an epoxy group derived from the silane coupling agent obtained in the first reaction process with the compound having an epoxy group can be ring-opened and hydrophilized by a known method.

As the silane coupling agent having an unsaturated group, for example, vinyltrimethoxysilane, vinyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, and the like can be exemplified.

When the silane coupling agent having an unsaturated group is used, a hydrophilic monomer is preferably used as the hydrophilic compound.

As the hydrophilic monomer, one or more types selected from (meth)acrylic acid esters such as, for example, N-vinyl-2-pyrrolidone, N-vinylacetamide, (meth)acrylamide, N-isopropyl(meth)acrylamide, N,N-dimethyl(meth)acrylamide-2-hydroxyethyl(meth)acrylate, ethylene glycol (meth)acrylate, polyethylene glycol (meth)acrylate, propylene glycol (meth)acrylate, and polypropylene glycol (meth)acrylate, and the like can be used.

As used in the present specification, the term "(meth)acryl" means at least one selected from acryl and methacryl.

Also, in the present specification, "(meth)acrylate" means at least one selected from acrylate and methacrylate.

In the second reaction process, as a method of reacting the base material having an unsaturated group (double bond) derived from the silane coupling agent obtained in the first reaction process with the hydrophilic monomer, a method of graft polymerization under known conditions or the like can be exemplified.

As the silane coupling agent having an amino group, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, and the like can be exemplified.

When the silane coupling agent having an amino group is used, an acid anhydride is preferably used as the hydrophilic compound.

Also, when the silane coupling agent having an amino group is used, the base material having an amino group derived from the silane coupling agent obtained in the first reaction process may be used as it is as the porous silica gel having a hydrophilized surface without performing the second reaction process.

As the silane coupling agent which introduces an isocyanate group, tris-(trimethoxysilylpropyl) isocyanurate, 3-ureidopropyltrialkoxysilane, 3-isocyanatopropyltriethoxysilane, and the like can be exemplified.

When the silane coupling agent which introduces an isocyanate group is used, the above-described polyhydric alcohol compound may be used or an amine compound may be used as the hydrophilic compound.

Also, as other silane coupling agents, for example, 3-mercaptopropylmethyldimethoxysilane, 3-mercaptopropyltrimethoxysilane, and the like may be used.

In this case, the above-described polyhydric alcohol compound may be used or an amine compound may be used as the hydrophilic compound.

In the guard column of the present embodiment, a pressure difference when an aqueous solution is fed at a linear flow rate of 2.1 cm/min is 4.0 MPa or more, more preferably 4.5 MPa or more, and still more preferably 5.0 MPa or more. When the above-described pressure difference is 4.0 MPa or more, injection noise can be reduced in size-exclusion chromatography using the liquid chromatograph in which the guard column of the present embodiment, the analytical column, and the light scattering detector are provided in this order from an upstream side. When the pressure difference is 4.0 MPa or more, the pressure difference can be arbitrarily selected as needed and may be, for example, 6.0 MPa or more, 7.0 MPa or more, 8.0 MPa or more, 9.0 MPa or more, and 10.0 MPa or more. Although an upper limit value of the pressure difference can be arbitrarily selected, when the pressure difference is too large, since there is a likelihood that durability of the guard column will deteriorate and there is a constraint on a measurable device, the above-described pressure difference is preferably 12.0 MPa or less. For example, it may be 11.5 MPa or less or 11.0 MPa or less.

It is presumed that an effect obtained due to the above-described pressure difference being 4.0 MPa or more is derived from the fact that a filling state of the filler is suitable. That is, it is presumed that, when the above-described filling state of the filler is suitable in the filling part of the guard column of the present embodiment having a specific length, a cause of injection noise generated by an injection shock is removed by the guard column.

Also, the pressure difference of the guard column when an aqueous solution is fed at a linear flow rate of 2.1 cm/min is preferably 12 MPa or less as described above. When the pressure difference is 12 MPa or less, deterioration in durability of the guard column due to the above-described pressure difference being too large can be suppressed, and constraints on devices such as pumps, pipes, and the like used for measuring the above-described pressure difference are small, and these are preferable.

[Method of Measuring Pressure Difference of Guard Column]

A pressure difference of the guard column when an aqueous solution is fed at a linear flow rate of 2.1 cm/min can be measured by the method described below.

A pump having a pressure sensor, the guard column, and the analytical column are prepared and connected in this order from an upstream side using pipes. Then, an aqueous solution is fed into the cylindrical component of the guard column from an inlet thereof using the pump at a linear flow rate of 2.1 cm/min. A feed pressure of the aqueous solution at this time is measured by the pressure sensor of the pump. In this way, the pressure on the inlet side is measured.

Next, the guard column is removed, and an empty column filled with the aqueous solution in place of the filling part is connected in the same manner as the guard column. The empty column used here has the same structure as the guard column except that a filling part is not formed. That is, the empty column is formed by attaching an inlet part component and an outlet part component to the same cylindrical component as that used in the guard column. This cylindrical component contains only the aqueous solution.

Then, the aqueous solution is fed into the empty column and the analytical column at a linear flow rate of 2.1 cm/min using the pump. A feed pressure of the aqueous solution at this time is measured by the pressure sensor of the pump.

Thereafter, a pressure difference is calculated from the pressure when the guard column is connected and the pressure when the empty column is connected obtained as described above. A calculated value is used as the pressure difference of the guard column when the aqueous solution is fed at the linear flow rate of 2.1 cm/min.

A plurality of guard columns of the present embodiment may be used by connecting them in series. In this case, it is presumed that the injection noise reduction effect of each column will be added. The number to be connected can be arbitrarily selected and may be, for example, two to four.

In a case in which the plurality of guard columns of the present embodiment are used to be connected in series, when the guard columns included in the liquid chromatograph deteriorate, only a part of the guard columns may be replaced or all of them may be replaced. The number of guard columns to be replaced can be appropriately determined according to a deterioration state of the guard columns.

"Method for producing guard column" The guard column of the present embodiment can be produced by an arbitrarily selected production method, preferably by, for example, the production method described below. However, the present invention is not limited to the following example.

First, a cylindrical component having a constant cross-sectional area, extending in a length direction, and in which a length of an inner wall surface is 2.0 cm to 3.5 cm is prepared. Next, an outlet part component is attached to an outlet side of the cylindrical component. Also, a filler made of porous silica gel having a hydrophilized surface and an average particle size of 1.5 μm to 2.5 μm is prepared.

Thereafter, the cylindrical component is filled with the filler at a filling pressure of 12 MPa to 40 MPa and preferably 15 MPa to 30 MPa per 1 cm in length. By this operation, a filling part having a length of 2.0 cm to 3.5 cm is formed (filling process). After the filler is filled, an inlet part component is fixed to an inlet side of the cylindrical component. Thereby, the guard column can be produced.

In the filling process, when the filler is filled at a filling pressure of 12 MPa or more per 1 cm of a length of the filling part, the guard column having a pressure difference of 4.0 MPa or more when the aqueous solution is fed at a linear flow rate of 2.1 cm/min can be preferably obtained when a length of the guard column is 2.0 cm to 3.5 cm. When the above-described filler is filled at a filling pressure of 40 MPa or less per 1 cm of the length of the filling part, crushing of the filler due to filling of the filler does not easily occur, and a filling state of the filler is not adversely affected. Also, when the above-described filler is filled at a filling pressure of 30 MPa or less per 1 cm of the length of the filling part, the above-described pressure difference does not become too large. Therefore, deterioration in durability of the guard column due to the above-described pressure difference being too large can be suppressed. Also, constraints on devices such as pumps, pipes, and the like used for measuring the above-described pressure difference are small, and this is preferable.

In the method for producing the guard column of the present embodiment, the method of filling the cylindrical component with the filler is not particularly limited. For example, a known filling method such as an equilibrium density method or a slurry filling method can be used. The slurry filling method is preferably used.

When the filler is filled into the cylindrical component using the slurry filling method, for example, the method described below can be suitably used.

First, the filler is dispersed in a dispersion solvent to form a slurry. An amount of the filler used to form the filling part can be determined according to an internal volume of the cylindrical component. Specifically, the amount of the filler used is preferably in a range of the same volume as a volume surrounded by an inner wall surface of the cylindrical component or more and 1.5 times or less the volume surrounded by the inner wall surface. The amount of the filler used is more preferably in a range of 1.1 to 1.4 times the volume surrounded by the inner wall surface. Also, the dispersion solvent that can be used in the slurry can be arbitrarily selected, and examples thereof include methanol, ethanol, isopropanol, and the like.

A filler content in the slurry is not particularly limited, but is preferably in a range of, for example, 5% by mass to 10% by mass. When the filler content in the slurry is within the above-described range, the filler in the slurry supplied into a housing easily moves together with the dispersion solvent, and the filler is easily disposed substantially uniformly without gaps. Also, when the filler content in the slurry is within the above-described range, since it can be easily fed, a filling pressure of the filler can be adjusted with high accuracy.

Next, the cylindrical component to which the outlet part component is attached is connected to a filling packer. Thereafter, the slurry formed of the dispersion solvent and the filler is put into the filling packer, and then a pump is connected to the filling packer. Then, a pressing liquid is fed into the above-described packer at a predetermined feed pressure using the pump. Thereby, the slurry and the pressing liquid are fed into the cylindrical component. The pressing liquid can be arbitrarily selected, and water may be used, or a liquid mixture of water and a water-soluble alcohol may be used.

A filling pressure of the filler to be filled into the cylindrical component at the time of filling can be adjusted by adjusting the feed pressure of the pressing liquid by a feed rate of the pressing liquid. Specifically, the feed pressure at the end of feeding the pressing liquid may be set to reach a target filling pressure of the filler. That is, the feed pressure at the end of feeding the pressing liquid is preferably 12 MPa to 40 MPa per 1 cm of the length of the filling part, and preferably 15 MPa to 30 MPa per 1 cm of the length of the filling part. For example, when the length of the filling part is 2.0 cm to 3.5 cm, the feed pressure at the end of feeding the pressing liquid is preferably 25 MPa to 50 MPa and more preferably 30 MPa to 40 MPa.

It is preferable that feeding of the slurry and the pressing liquid are performed until all the slurry and the pressing liquid having a volume three times a volume of the slurry or more have passed through the cylindrical component. The feed pressure at the end of feeding the pressing liquid is a filling pressure of the filler at the time of filling. When the feeding of the pressing liquid is completed, formation of the filling part is completed.

After the formation of the filling part is completed, the filling packer is removed from the cylindrical component to which the outlet part component is attached, and the inlet part component is fixed and sealed on the inlet side of the cylindrical component.

With the processes described above, the guard column of the present embodiment can be obtained.

"Liquid Chromatograph"

The liquid chromatograph of the present embodiment is a device in which the guard column of the present embodiment, the analytical column, and the light scattering detector are provided in this order from an upstream side. In the liquid chromatograph of the present embodiment, an injector connected to the pump is preferably connected to an upstream side of the guard column via a pipe.

The liquid chromatograph of the present embodiment may further include a detector such as a differential refractive index detector or an ultraviolet absorption detector together with the light scattering detector as needed.

Also, an in-line filter may be further connected at a necessary place in the liquid chromatograph of the present embodiment as needed.

(Analytical Column)

In the present embodiment, a size-exclusion chromatography column filled with a filler containing porous silica gel is preferably used as the analytical column.

As the analytical column, a column in which the filler is filled into a housing is used. In the present embodiment, although a length of the analytical column can be arbitrarily selected, an analytical column in which a length of a filling part formed of the filler is 15.0 cm to 30.0 cm is preferably used. When the length of the filling part is 15.0 cm or more, satisfactory protein separation performance can be easily obtained when an analysis for a protein is performed using the liquid chromatograph of the present embodiment, and this is preferable. When the length of the filling part is 30.0 cm or less, a pressure load applied to the analytical column tends to be appropriate, and this is preferable.

An inner diameter of the analytical column (inner diameter of the housing) can be arbitrarily selected but is preferably 0.1 cm to 2 cm and more preferably 0.4 cm to 0.9 cm similarly to the inner diameter of the cylindrical component (inner diameter of the guard column) in the guard column of the present embodiment. The inner diameter of the housing of the analytical column is preferably the same as the inner diameter of the cylindrical component of the guard column (inner diameter of the guard column) of the present embodiment. In this case, since the analytical column and the guard column become similar ones, injection noise in the size-exclusion chromatography using the liquid chromatograph of the present embodiment can be further reduced.

Also, the inner diameter of the housing of the analytical column can be appropriately selected according to types and amounts of samples to be analyzed. For example, when a protein is analyzed using the liquid chromatograph of the present embodiment, the inner diameter of the housing of the analytical column is more preferably 0.4 cm to 0.9 cm.

As in the components of the guard column of the present embodiment, materials used for components of the analytical column can be appropriately selected according to an eluent used for the size-exclusion chromatography and a sample to be measured. Specifically, for example, stainless steel may be used, or a synthetic resin such as polyether ether ketone resin (PEEK) may be used.

The filler of the analytical column includes porous silica gel. The above-described filler is preferably formed only of porous silica gel having a hydrophilized surface. A filler that is not porous silica gel may be contained. As the filler that is not porous silica gel, those formed of an organic polymer or the like can be exemplified.

The filler of the analytical column is preferably formed only of the porous silica gel having a hydrophilized surface, and more preferably the same filler as the filler of the guard column of the present embodiment.

In a case in which the filler of the analytical column is the porous silica gel having a hydrophilized surface, when a protein is analyzed using the liquid chromatograph of the present embodiment, proteins are not easily adsorbed on a surface of the filler of the analytical column, and highly accurate analysis results can be obtained. When the filler of the analytical column is the same as the filler of the guard column of the present embodiment, the analytical column and the guard column become similar ones. Therefore, injection noise in the size-exclusion chromatography using the liquid chromatograph of the present embodiment can be further reduced.

A pore size distribution of the porous silica gel used as the filler of the analytical column is preferably 25 nm to 35 nm and more preferably 28 nm to 32 nm. When the pore size distribution of the porous silica gel is 28 nm to 32 nm, satisfactory protein separation performance can be easily obtained in size-exclusion chromatography of proteins, and this is preferable. An average pore size of the porous silica gel is measured with a gas adsorption type specific surface area measuring device.

Columns which are available on the market may be used as the analytical column. As the columns available on the market, KW-803 series, KW-400 series, LW-403 4D, LW-803, (all of which are manufactured by Showa Denko KK) and the like which are commercially available as size-exclusion chromatography columns suitable for a protein analysis can be exemplified.

In the present embodiment, a known device can be used as the light scattering detector, and an appropriate selection can be made according to a sample to be measured, a purpose, or the like. As the light scattering detectors available on the market, DAWN8+(manufactured by Watt technology), PL-RTLS and PL-HTLS (both of which are manufactured by Agilent Technologies, Inc.), and the like can be exemplified.

"Method of Analyzing Polymer Compound"

In a method of analyzing a polymer compound of the present embodiment, a polymer compound can be analyzed by size-exclusion chromatography using the liquid chromatograph of the present embodiment. The analysis method of the present embodiment can be suitably used when a polymer compound is a subject to be analyzed and particularly a protein is analyzed.

In the method of analyzing a polymer compound of the present embodiment, an aqueous eluent in which a salt is dissolved in water is preferably used as an eluent. As the salt contained in the eluent, sodium chloride, potassium chloride, sodium sulfate, and the like can be preferably exemplified.

The eluent may contain a buffer solution to improve reproducibility of an analysis. As the buffer solution, a phosphate buffer solution or the like can be suitably used.

Further, the eluent may contain a water-soluble organic solvent in a range in which salt precipitation does not cause a problem. Specifically, a water-soluble organic solvent content in the eluent is preferably 10% by mass or less. As an example of the water-soluble organic solvent, methanol, acetonitrile, or the like can be exemplified.

In the method of analyzing a polymer compound of the present embodiment, a polymer compound is analyzed by size-exclusion chromatography using the liquid chromatograph including the guard column of the present embodiment. Therefore, injection noise when the light scattering detector is used can be curbed. Therefore, a polymer compound can be analyzed with high accuracy by the method of analyzing a polymer compound of the present embodiment. Particularly, the method of analyzing a polymer compound of the present embodiment is suitable for measuring an absolute molecular weight of a protein.

It is presumed that an effect of curbing injection noise in the analysis method of the present embodiment is obtained by provision of the guard column of the present embodiment in the liquid chromatograph of the present embodiment. More specifically, it is presumed that a substance in a sample that contaminates the analytical column is adsorbed by the filler of the guard column by a synergistic effect when the guard column of the present embodiment satisfies all of the following (1) to (3).

(1) The filler is made of porous silica gel having a hydrophilized surface, and an average particle size of the porous silica gel is 1.5 pin to 2.5 pin.

(2) A length of the filling part is 2.0 cm to 3.5 cm.

(3) A pressure difference when an aqueous solution is fed at a linear flow rate of 2.1 cm/min is 4.0 MPa or more.

Also, the guard column of the present embodiment also has performance as an original "guard column." That is, the guard column of the present embodiment can obtain an effect of preventing contamination of the analytical column by removing contaminants in an eluent and a measurement sample. Therefore, in the liquid chromatograph of the present embodiment, deterioration of the analytical column is suppressed in addition to the effect of curbing injection noise, and thereby prolonging a service life of the analytical column can be achieved. That is, when the guard column is deteriorated by repeatedly analyzing polymer compounds using the liquid chromatograph of the present embodiment, the guard column may be replaced.

EXAMPLES

Hereinafter, the effects of the present invention will become apparent by examples and comparative examples. Further, the present invention is not limited to the following examples and can be implemented with appropriate modifications within a range not changing the gist thereof.

Example 1

[Production of Filler]

A guard column of Example 1 was produced by a method described below.

100 g of a spherical porous silica gel base material (trade name: M.S.GEL EP-DF-1.9-250A, manufactured by AGC SI-Tech Co., Ltd.) was dispersed in 500 g of a 20 mM acetate buffer solution (pH 5.5; containing 0.063 g of acetic acid and 0.75 g of sodium acetate, manufactured by Junsei Chemical Co., Ltd.) serving as a solvent to prepare a dispersion liquid. 50 g of a silane coupling agent (glycidoxypropyltrimethoxysilane, manufactured by JNC Corporation) was added to the obtained dispersion liquid, and this was stirred at 70° C. for 17 hours.

Thereafter, suction filtration was performed to separate and obtain a base material having an epoxy group derived from a silane coupling agent as a solid phase (first reaction process).

The separated and obtained solid phase was washed with water and methanol in sequence and dried. The washed and dried solid phase was dispersed in a 50 mM sulfuric acid aqueous solution and heated and stirred at 80° C. for 2 hours, and thereby the base material having an epoxy group derived from a silane coupling agent was reacted with water which was a hydrophilic compound. Thereafter, suction filtration was performed to separate and obtain the target solid phase, and the solid phase was washed with water and acetone in sequence and dried (second reaction process). With the processes described above, 106 g of the porous silica gel having a hydrophilized surface was obtained.

The obtained porous silica gel having a hydrophilized surface is spherical. An average particle size of this which was measured using a Coulter counter (Multisizer 4, manufactured by Beckman Coulter) was 1.9 μm. Also, an average pore size and a specific surface area of the porous silica gel having a hydrophilized surface were measured using a gas adsorption type specific surface area measuring device (BELSORP-mini II manufactured by Microtrac Bell). As a result, the average pore size was 28 nm and the specific surface area was 150 $m^2/g$.

[Production of Guard Column]

0.2 g of the porous silica gel having a hydrophilized surface obtained in this way was dispersed in 4 ml of isopropanol to prepare a dispersion liquid (slurry).

Also, a filling packer having an inner diameter of 0.46 cm and a length of 30 cm was connected to a cylindrical component to which an outlet part component was attached. As the outlet part component and the cylindrical component, those made of stainless steel were used. Also, as the cylindrical component, one having a constant cross-sectional area, an inner wall surface extending in a length direction with a length of 2.0 cm, and an inner diameter of 0.46 cm was used.

Thereafter, the slurry was put into the filling packer, and a pump (Alliance 2695, manufactured by Waters) was connected to the filling packer. Then, water as a pressing liquid was fed at a maximum feed rate of 3.0 ml/min for 8 minutes using the pump. The feeding of the pressing liquid was performed while increasing a feed pressure from the start of the feeding until the feed pressure reached a maximum feed pressure of 30 MPa (15 MPa per 1 cm of a length of the filling part). Then, the pressing liquid was fed at the maximum feed pressure from a time point when the feed pressure reached the maximum feed pressure until the feeding ended. Thereby, the filler was filled into the cylindrical component to form the filling part having a length of 2.0 cm.

After the filling of the filler into the cylindrical component ended, the cylindrical component to which the outlet part component was attached was removed from the filling packer after waiting for the feed pressure due to the pump to drop. Then, an inlet part component was fixed and sealed on an inlet side of the cylindrical component. With the processes described above, the guard column of Example 1 was obtained.

Next, for the guard column of Example 1, a pressure difference of the guard column when an aqueous solution was fed at a linear flow rate of 2.1 cm/min was measured by the method described below.

Specifically, a pump (Alliance 2695, manufactured by Waters) having a pressure sensor, the guard column of Example 1, an analytical column (trade name: LW-403 4D, manufactured by Showa Denko KK), and a light scattering detector (DAWN8+, manufactured by Wyatt technology) were connected in this order from an upstream side using pipes. Then, the aqueous solution composed of a 50 mM phosphate buffer solution (containing 0.3M NaCl having a pH of 6.7) was fed into the cylindrical component of the guard column of Example 1 at a linear flow rate of 2.1 cm/minute using the pump. A feed pressure of the aqueous solution at this time was measured by the pressure sensor of the pump. The pressure was 20.5 MPa.

Next, only the guard column of Example 1 was removed, and an empty column was connected after filling the inside with the aqueous solution composed of the 50 mM phosphate buffer solution (containing 0.3M NaCl having a pH of 6.7) in place of the guard column of Example 1. Then, the aqueous solution was fed into the empty column at a linear flow rate of 2.1 cm/min using the pump. A feed pressure of the aqueous solution at this time was measured by the pressure sensor of the pump. The pressure was 14.7 MPa.

Thereafter, a difference between the two pressures obtained as described above was calculated. As a result, the pressure difference of the guard column of Example 1 when the aqueous solution was fed at the linear flow rate of 2.1 cm/min was 5.8 MPa.

[Ascertaining Injection Noise]

An injector, the guard column of Example 1, an analytical column, and a light scattering detector (DAWN8$^+$, manufactured by Wyatt technology) were connected to a pump (Alliance 2695, manufactured by Waters) in this order from an upstream side. As the analytical column (a size-exclusion chromatography column), a column (trade name: LW-403 4D, manufactured by Showa Denko KK) having a filling part length of 15 cm and a housing inner diameter of 0.46 cm, and into which a filler having an average particle diameter of 1.9 μm made of porous silica gel having a hydrophilized surface was filled was used.

Thereafter, the injector, the guard column of Example 1, and the analytical column were installed in a column oven (manufactured by Waters) which was set at 30° C.

Thereafter, the 50 mM phosphate buffer solution (containing 0.3M NaCl and having a pH of 6.7) serving as an eluent was caused to flow into the guard column of Example 1 at a feed rate of 0.35 ml/min for about 60 minutes using the pump, and it was ascertained that a baseline of an obtained chromatogram were stable.

Next, 2.4 mg/ml BSA (bovine serum albumin, manufactured by SIGMA ALDRICH) serving as a sample was injected into the guard column of Example 1 in an amount of 5 μl using the injector. Then, a chromatogram of Example 1 was obtained from a signal at 90 degrees (intensity of scattered light in the 90 degrees direction) in the light scattering detector.

Example 2

A guard column of Example 2 was obtained by forming a filling part having a length of 2.0 cm in the same manner as in Example 1 except that a feed pressure at the end of feeding the pressing liquid was 40 MPa (20 MPa per 1 cm of a length of the filling part). For the guard column of Example 2, a pressure difference when the aqueous solution was fed at a linear flow rate of 2.1 cm/min was measured in the same manner as in Example 1, and the result was 10.4 MPa.

Figure 2:
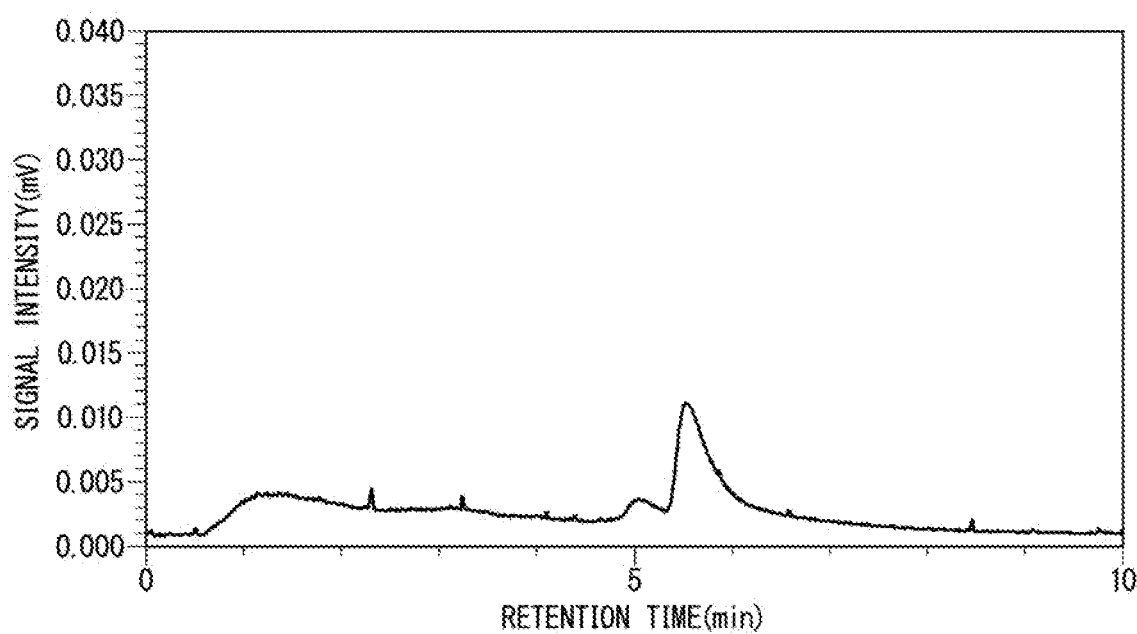
FIG. 2 is a chromatogram showing a result of analyzing a polymer compound using a liquid chromatograph of Example 2.

Then, a liquid chromatograph of Example 2 was prepared in the same manner as in Example 1 except that the guard column of Example 2 was used, and an analysis on a polymer compound (BSA) was performed. An obtained chromatogram is shown in FIG. 2.

Example 3

Two guard columns used as guard units were produced in the same manner as in Example 1 except that a filling part having a length of 1.0 cm was formed with porous silica gel in an amount of 0.1 g using a cylindrical component having an inner wall surface length of 1.0 cm. Further, although a feed pressure at the end of feeding the pressing liquid was 30 MPa as in Example 1, since the length of the filling part was different from that of Example 1, a filling pressure per 1 cm of a length of the filling part was 30 MPa unlike that in Example 1.

The guard columns used as the two guard units were connected in series via a pipe to form a guard column of Example 3. For the guard column of Example 3, a pressure difference when the aqueous solution was fed at a linear flow rate of 2.1 cm/min was measured in the same manner as in Example 1. As a result, the pressure difference was 10.0 MPa.

Figure 3:
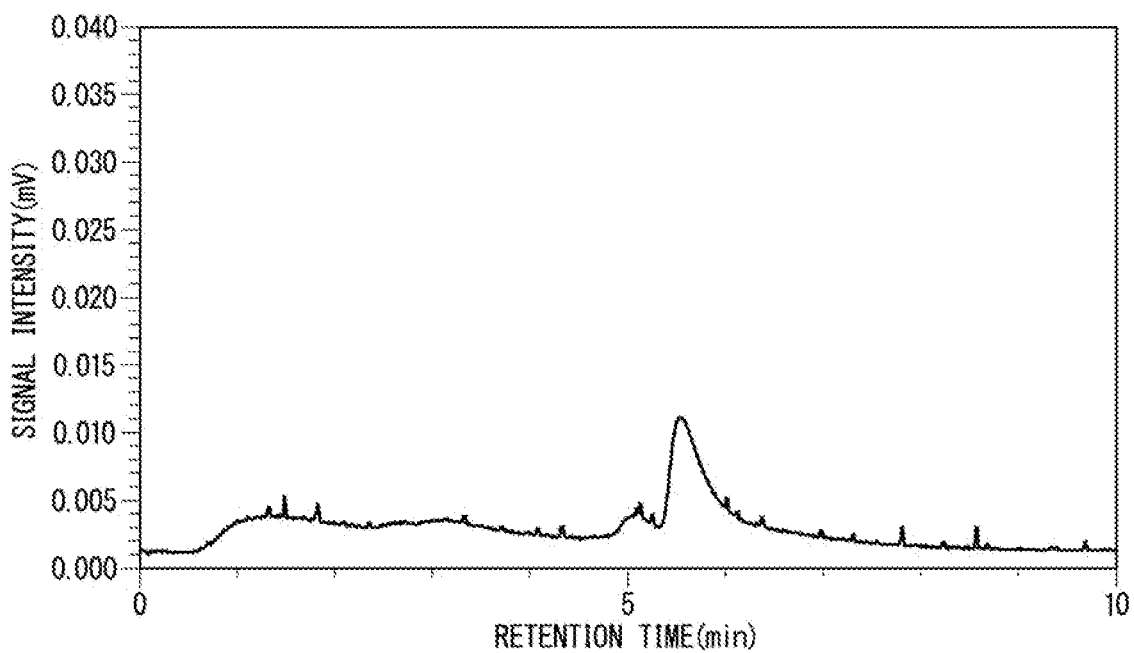
FIG. 3 is a chromatogram showing a result of analyzing a polymer compound using a liquid chromatograph of Example 3.

Then, a liquid chromatograph of Example 3 was prepared in the same manner as in Example 1 except that the guard column of Example 3 was used, and an analysis on a polymer compound (BSA) was performed. An obtained chromatogram is shown in FIG. 3.

Comparative Example 1

Figure 4:
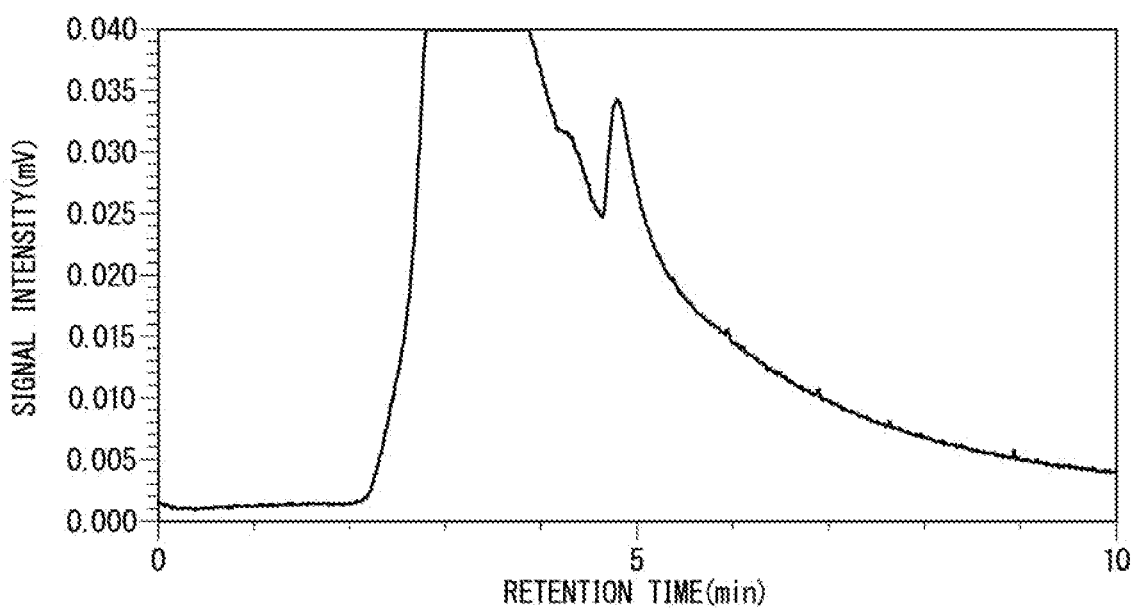
FIG. 4 is a chromatogram showing a result of analyzing a polymer compound using a liquid chromatograph of Comparative Example 1.

An analysis on a polymer compound (BSA) was performed in the same manner as in Example 1 except that the guard column was removed. An obtained chromatogram is shown in FIG. 4.

A pressure difference of the analytical column when the aqueous solution was fed at a linear flow rate of 2.1 cm/min was calculated according to the method of measuring the pressure difference of the guard column of Example 1. That is, a pressure when the aqueous solution was fed into the analytical column at a linear flow rate of 2.1 cm/min with the pump connected to the analytical column, and a pressure when the aqueous solution was fed into an empty column at a linear flow rate of 2.1 cm/min, wherein the empty column was a column from which the filler had been removed from the analytical column and was connected in place of the analytical column, were measured. Then, the pressure difference was obtained by calculating it from the obtained values.

As the aqueous solution, the 50 mM phosphate buffer solution (containing 0.3M NaCl having a pH of 6.7) was used. As a result, the pressure difference of the analytical column when the aqueous solution was fed at the linear flow rate of 2.1 cm/min was 14 MPa.

Comparative Example 2

A guard column of Comparative Example 2 was obtained by forming a filling part having a length of 2.0 cm in the same manner as in Example 1 except that a feed pressure at the end of feeding the pressing liquid was 20 MPa (10 MPa per 1 cm of a length of the filling part). For the guard column of Comparative Example 2, a pressure difference when the aqueous solution was fed at a linear flow rate of 2.1 cm/min was measured in the same manner as in Example 1. Further, a result of measuring the pressure difference was 3.4 MPa.

Figure 5:
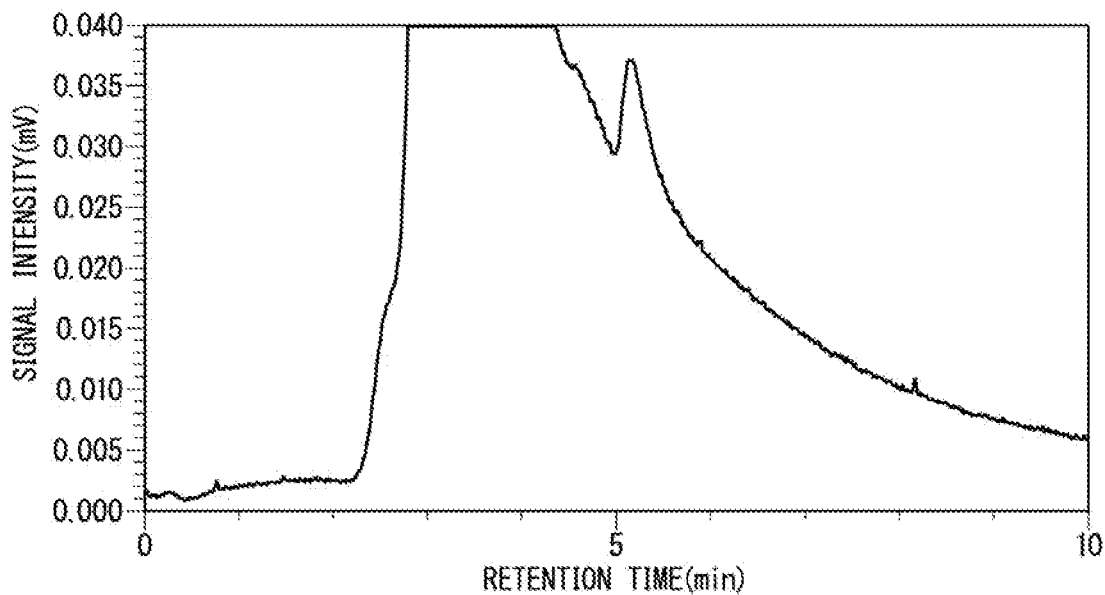
FIG. 5 is a chromatogram showing a result of analyzing a polymer compound using a liquid chromatograph of Comparative Example 2.

Then, a liquid chromatograph of Comparative Example 2 was prepared in the same manner as in Example 1 except that the guard column of Comparative Example 2 was used, and an analysis on a polymer compound (BSA) was performed. An obtained chromatogram is shown in FIG. 5.

Comparative Example 3

A filling part having a length of 1.0 cm was formed using 0.1 g of the same porous silica gel as that in Example 1 and using a cylindrical component having an inner wall surface length of 1.0 cm. A guard column of Comparative Example 3 was manufactured in the same manner as in Example 1 except that described above. Further, a feed pressure at the end of feeding the pressing liquid was 30 MPa as in Example 1, but a length of the filling part was different from that in Example 1. Therefore, a filling pressure per 1 cm of a length of the filling part was 30 MPa unlike that in Example 1. For the guard column of Comparative Example 3, a pressure difference when the aqueous solution was fed at a linear flow rate of 2.1 cm/min was measured in the same manner as in Example 1, and the result was 4.5 MPa.

Figure 6:
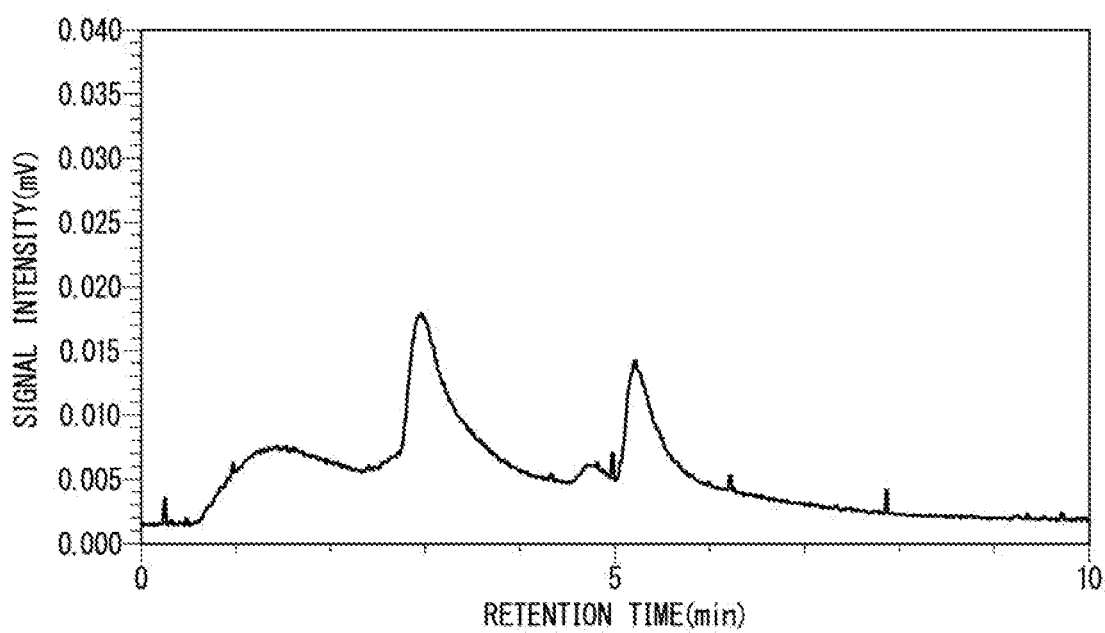
FIG. 6 is a chromatogram showing a result of analyzing a polymer compound using a liquid chromatograph of Comparative Example 3.

Then, a liquid chromatograph of Comparative Example 3 was prepared in the same manner as in Example 1 except that the guard column of Comparative Example 3 was used, and an analysis on a polymer compound (BSA) was performed. An obtained chromatogram is shown in FIG. 6.

Comparative Example 4

Porous silica gel having a hydrophilized surface was obtained in the same manner as in Example 1 except that M. S. GEL EP-DF-3-250A (trade name, manufactured by AGC SI-Tech Co., Ltd.) was used as a spherical porous silica gel base material.

The obtained porous silica gel having a hydrophilized surface had a spherical shape, an average particle size of 3.0 μm, an average pore size of 28 nm, and a specific surface area of 135 m$^2$/g.

A guard column of Comparative Example 4 was obtained by forming a filling part having a length of 2.0 cm in the same manner as in Example 1 except that the porous silica gel having a hydrophilized surface obtained as described above was used. For the guard column of Comparative Example 4, a pressure difference when the aqueous solution was fed at a linear flow rate of 2.1 cm/min was measured in the same manner as in Example 1. As a result, the pressure difference was 1.4 MPa.

Figure 7:
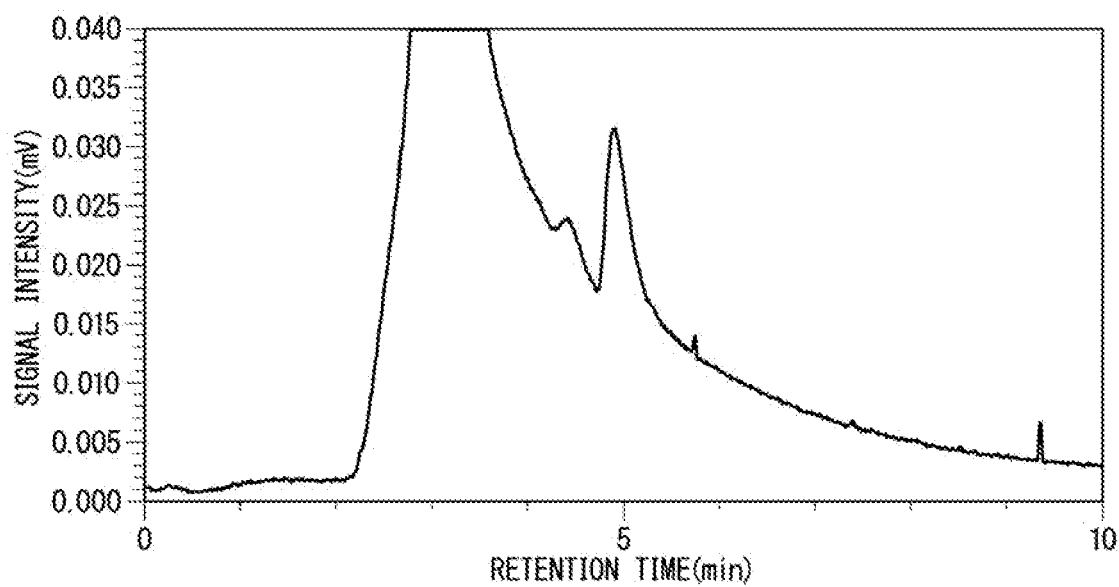
FIG. 7 is a chromatogram showing a result of analyzing a polymer compound using a liquid chromatograph of Comparative Example 4.

Then, a liquid chromatograph of Comparative Example 4 was prepared in the same manner as in Example 1 except that the guard column of Comparative Example 4 was used, and an analysis on a polymer compound (BSA) was performed. An obtained chromatogram is shown in FIG. 7.

Table 1 shows average particle sizes of the porous silica gel of the guard columns having a hydrophilized surface, lengths of the filling parts, filling pressures of the fillers when they are filled (feed pressures at the end of feeding the pressing liquid), filling pressures per 1 cm of each length of the filling parts, and pressure differences when the aqueous solution was fed at a linear flow rate of 2.1 cm/min in examples 1 to 3 and Comparative Examples 1 to 4 together.

TABLE 1

| Units | Average particle size μm | Length of filling part cm | Filling pressure when filling Mpa | Filling pressure per 1 cm Mpa | Pressure difference Mpa | Noise level |
|---|---|---|---|---|---|---|
| Example 1 | 1.9 | 2.0 | 30 | 15 | 5.8 | 0.82 |
| Example 2 | 1.9 | 2.0 | 40 | 20 | 10.4 | 0.28 |
| Example 3 | 1.9 | 1.0 × 2 | 30 | 30 | 10.0 | 0.26 |
| Comparative Example 1 | 1.9 | — | — | | — | 12.3 |
| Comparative Example 2 | 1.9 | 2.0 | 20 | 10 | 3.4 | 20.7 |
| Comparative Example 3 | 1.9 | 1.0 | 30 | 30 | 4.5 | 2.00 |
| Comparative Example 4 | 3.0 | 2.0 | 30 | 15 | 1.4 | 36.9 |

FIGS. 1 to 7 are chromatograms showing results of analysis on polymer compounds (BSA: bovine serum albumin) using the liquid chromatographs of Examples 1 to 3 and Comparative Examples 1 to 4. In the graphs shown in FIGS. 1 to 7, the vertical axis represents a signal intensity (my) and the horizontal axis represents a retention time (min).

As shown in FIGS. 1 to 3, a peak corresponding to the BSA serving as the sample was obtained in the vicinity of the retention time of 5.3 min in examples 1 to 3.

On the other hand, as shown in FIG. 4, in Comparative Example 1, although a peak corresponding to the BSA serving as the sample was obtained, a large amount of injection noise which made it difficult to observe a peak corresponding to the BSA was generated.

In Example 1 shown in FIG. 1, injection noise is curbed compared to that in Comparative Example 1 shown in FIG. 4. From this, it is ascertained that injection noise can be reduced when the guard column of Example 1 is connected to the upstream side of the analytical column.

Also, as shown in FIGS. 5 to 7, in Comparative Examples 2 to 4, a peak corresponding to the BSA serving as the sample was obtained in the vicinity of the retention time of 5.2 min. However, in all of Comparative Examples 2 to 4, large amount of injection noise which made it difficult to observe a peak corresponding to the BSA was generated.

In Comparative Example 2, the pressure difference of the guard column when the aqueous solution was fed at the linear flow rate of 2.1 cm/min was small. Therefore, as shown in FIG. 5, it is presumed that the reason was because a substance causing an injection shock was not sufficiently reduced by the guard column. Also, in Comparative Example 3, it is presumed that the reason was because the guard column having the filling part with an insufficient length was used and thus a substance causing an injection shock was not sufficiently reduced by the guard column as shown in FIG. 6.

Also, in Comparative Example 4, it is presumed that the reason was because the average particle size of the porous silica gel having a hydrophilized surface was too large, the guard column had a small pressure difference when the aqueous solution was fed at the linear flow rate of 2.1 cm/min, and thus a substance causing an injection shock was not sufficiently reduced by the guard column as shown in FIG. 7.

Also, in order to compare an influence of injection noise in the chromatograms of Examples 1 to 3 and Comparative Examples 1 to 4, the injection noise was regarded as a peak and was evaluated using a noise level calculated by the method described below. The results are shown in Table 1.

"Noise Level Evaluation Method"

Figure 8:
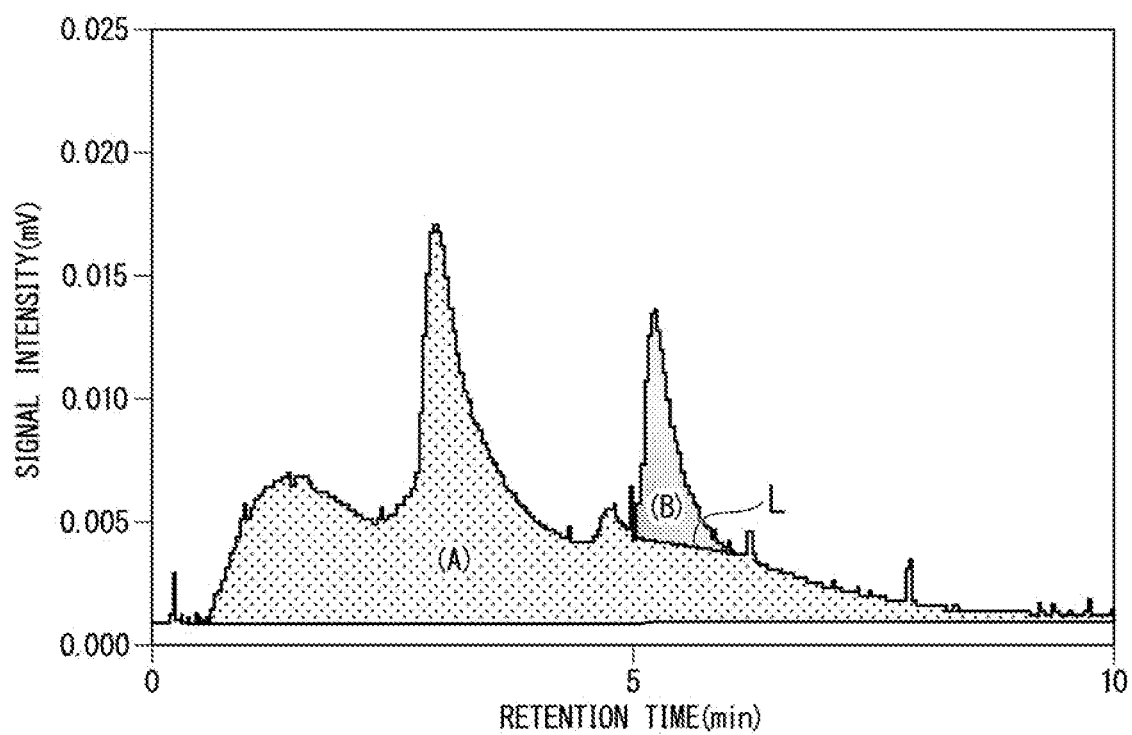
FIG. 8 is a chromatogram for explaining a method of calculating a noise level.

FIG. 8 is a chromatogram for explaining a method of calculating a noise level. FIG. 8 shows an injection noise peak area (A) and a BSA peak area (B). Each peak area is obtained as follows.

First, a total area of the entire peak observed within a retention time range (in the example shown in FIG. 8, until 10 minutes from the start of measurement) in which injection noise appears is obtained. Next, a peak derived from the BSA is obtained as the peak area (B) of a portion riding on a peak of the injection noise. The area (B) is an area obtained such that the peak derived from the BSA is divided from the peak of the injection noise by performing valley crossing treatment, and the area is a peak area up to the line denoted by a reference sign L in FIG. 8. Thereafter, an area obtained by subtracting the area (B) from the total area of the entire peak observed within the retention time range is obtained as the injection noise peak area (A).

Using these values, a value obtained by dividing the injection noise peak area (A) by the area (B) was calculated as the noise level as described in the following expression. A smaller numerical value of the noise level can be evaluated as less influence of the injection noise.

$$\text{Noise level} = (A)/(B)$$

As shown in Table 1, the noise levels in Examples 1 to 3 were 1.2 or less and were sufficiently small compared to the noise levels in Comparative Examples 1 to 4.

INDUSTRIAL APPLICABILITY

In the present invention, it is possible to provide a guard column used for size-exclusion chromatography in which a column using a filler containing porous silica gel and a light scattering detector are used and capable of curbing injection noise, and a method for producing the guard column.

The invention claimed is:

1. A guard column, comprising
  a filling part having a length of 2.0 cm to 3.5 cm formed of a filler, wherein
  the filler includes a porous silica gel,
  the porous silica gel has a hydrophilized surface, an average particle size of 1.5 μm to 2.5 μm, an average pore size of 25 nm to 35 nm, and a specific surface area of 100 m$^2$/g to 300 m$^2$/g, and
  a pressure difference when an aqueous solution is fed to the guard column at a linear flow rate of 2.1 cm/min is 4.0 MPa or more.

2. A guard column, comprising a filling part having a length of 2.0 cm to 3.5 cm formed of a filler, wherein
  the filler includes a porous silica gel having a hydrophilized surface and an average particle size of 1.5 μm to 2.5 μm,
  a pressure difference when an aqueous solution is fed at a linear flow rate of 2.1 cm/min is 4.0 MPa or more, and the guard column is used for size-exclusion chromatography in which a column using a filler containing porous silica gel and a light scattering detector are used with the guard column.

3. A liquid chromatograph comprising the guard column according to claim 1, a size-exclusion chromatography column filled with a filler containing porous silica gel, and a light scattering detector in this order from an upstream side.

4. A method of analyzing a polymer compound, which comprises:
analyzing the polymer compound with size-exclusion chromatography using the liquid chromatograph according to claim 3.

5. A method for producing a guard column according to claim 1, comprising:
a step of filling the filler including the porous silica gel having a hydrophilized surface and the average particle size of 1.5 µm to 2.5 µm at a filling pressure of 12 MPa to 40 MPa per 1 cm in length to form the filling part having a length of 2.0 cm to 3.5 cm.

6. The guard column according to claim 1, wherein a diameter of the filling part is 0.4 cm to 0.9 cm.

7. A guard column, comprising a filling part having a length of 2.0 cm to 3.5 cm formed of a filler, wherein
the filler includes a porous silica gel having a hydrophilized surface and an average particle size of 1.5 µm to 2.5 µm,
a pressure difference when an aqueous solution is fed at a linear flow rate of 2.1 cm/min is 4.0 MPa or more, and
wherein the porous silica gel having a hydrophilized surface is a silica gel which is obtained by treating porous silica gel, whose surface is not hydrophilized, with a silane coupling agent to form a functional group derived from the silane coupling agent and further reacting the functional group with a hydrophilic compound.

8. The guard column according to claim 7, wherein
the silane coupling agent has an epoxy group, and
the hydrophilic compound is water, a polyhydric alcohol compound, or a compound having an epoxy group.

9. The guard column according to claim 1, wherein the porous silica gel having a hydrophilized surface is a silica gel which is obtained by surface-treating porous silica gel, whose surface is not hydrophilized, with glycidoxypropyltrimethoxysilane and ring-opening an epoxy group formed on a surface thereof with water.

10. The method of analyzing a polymer compound according to claim 4, wherein the polymer compound is a protein.

11. The column according to claim 1, wherein the guard column is connected to an analytical column.

12. The column according to claim 11, wherein
the guard column is disposed on an upstream side of an analytical column,
the analytical column is filled with a filler containing a porous silica gel.

13. The column according to claim 11, wherein
the pressure difference is a difference between a pressure A and a pressure B, wherein
the pressure A is a pressure when an aqueous solution is fed at a linear flow rate of 2.1 cm/min into the guard column which is connected with an analyst column, and
the pressure B is a pressure when the aqueous solution is fed at the linear flow rate of 2.1 cm/min into an empty column which is connected with the analyst column, wherein the empty column is the guard column from which the filler has been removed.

14. A size-exclusion chromatography column comprising the guard column according to claim 1, and an analytical column.

* * * * *